Figure 1:
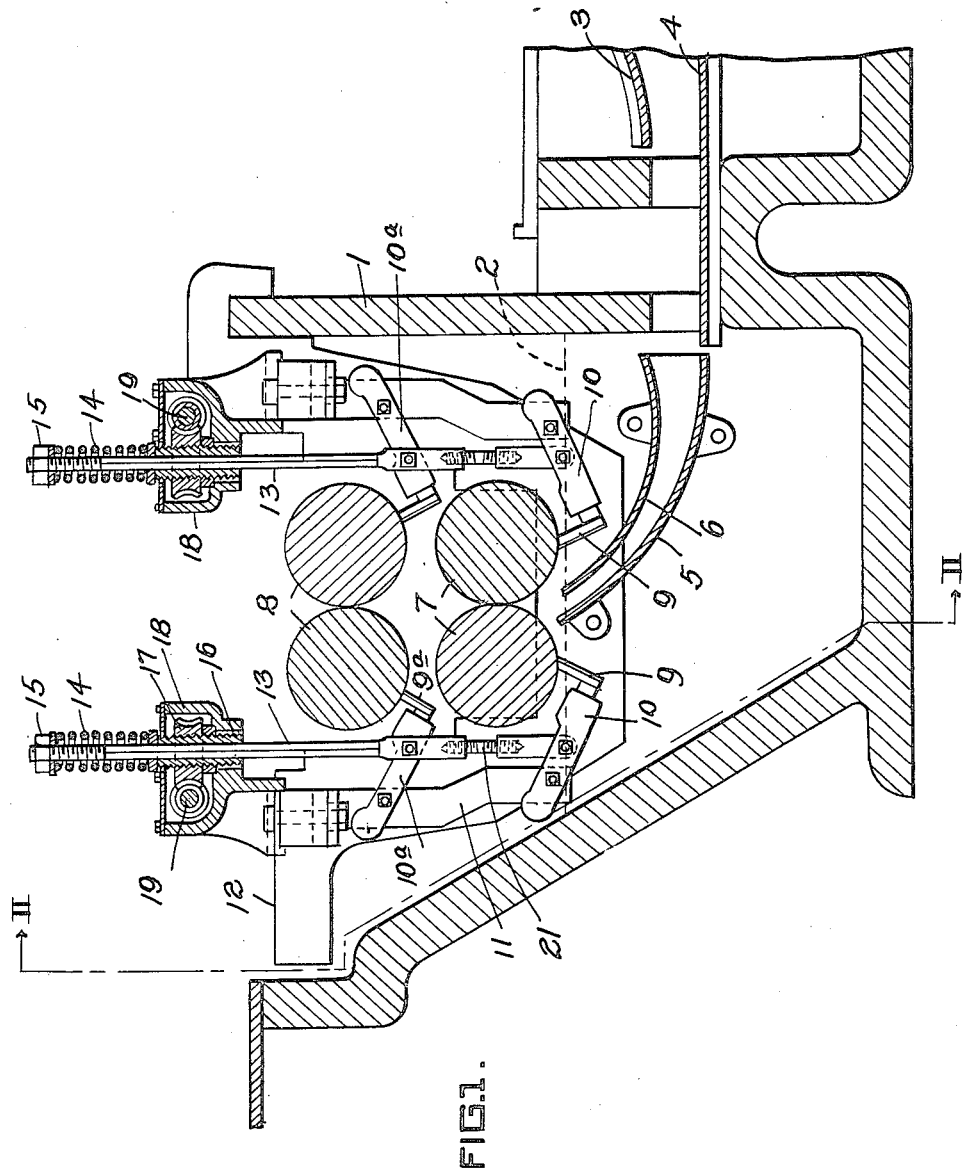

E. G. PORTER AND J. L. KLINDWORTH.
APPARATUS FOR COATING WITH MOLTEN METAL.
APPLICATION FILED JUNE 25, 1919.

1,322,946. Patented Nov. 25, 1919.

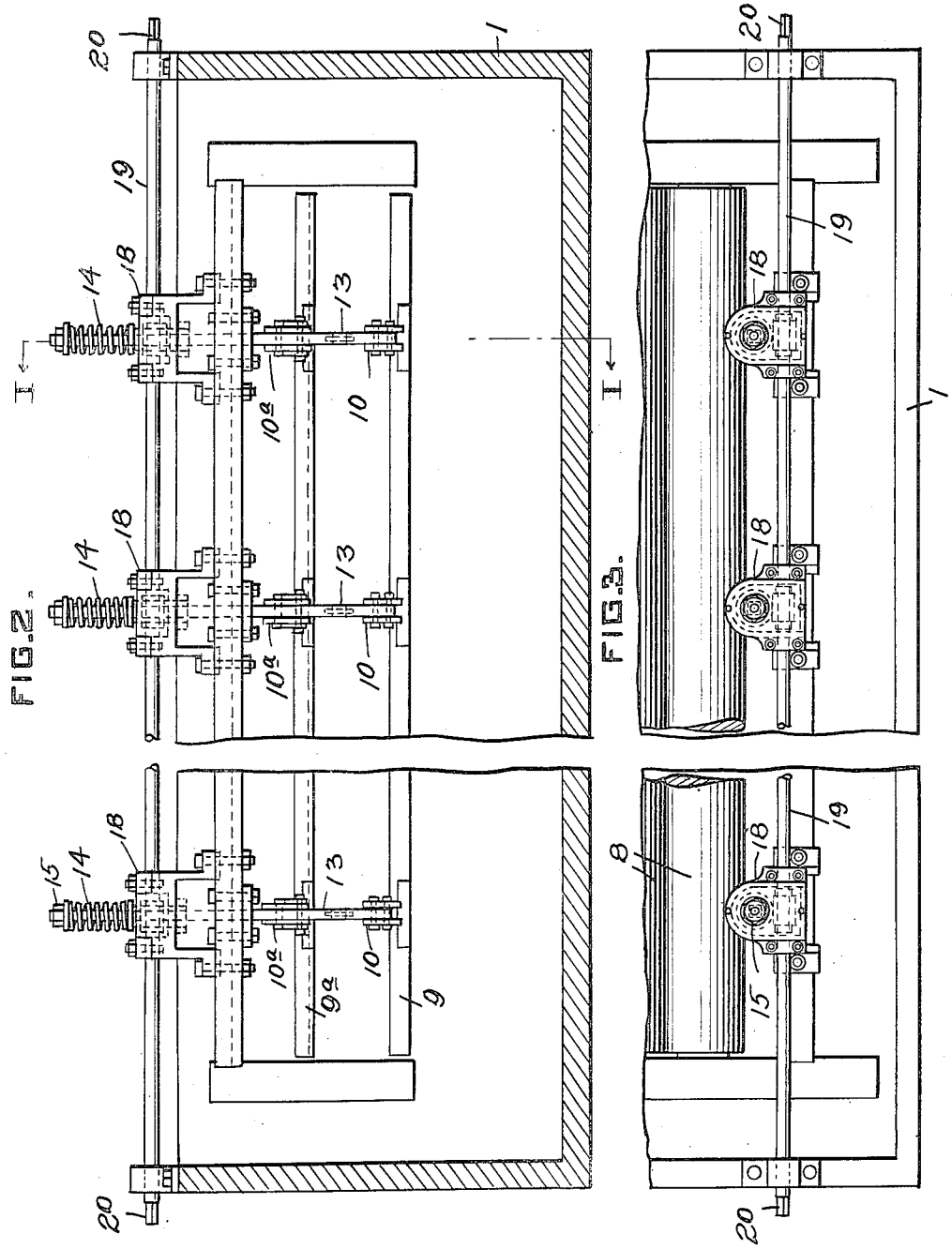

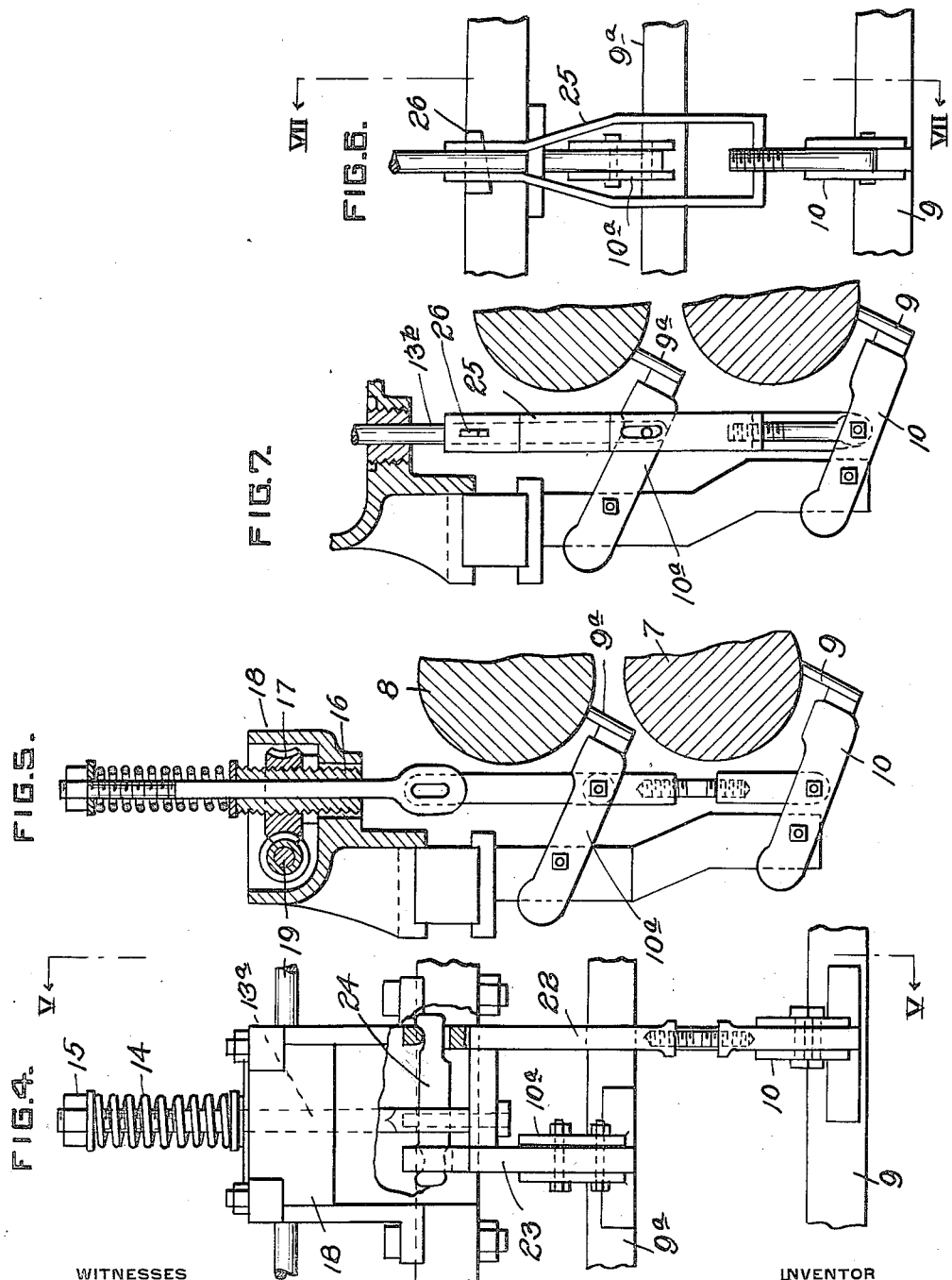

UNITED STATES PATENT OFFICE.

EDGAR G. PORTER, OF WOODLAWN, AND JOHN L. KLINDWORTH, OF CORAOPOLIS, PENNSYLVANIA.

APPARATUS FOR COATING WITH MOLTEN METAL.

1,322,946.  Specification of Letters Patent.  Patented Nov. 25, 1919.

Application filed June 25, 1919. Serial No. 306,514.

*To all whom it may concern:*

Be it known that we, EDGAR G. PORTER, residing at Woodlawn, in the county of Beaver and State of Pennsylvania, and JOHN L. KLINDWORTH, residing at Coraopolis, in the county of Allegheny and State of Pennsylvania, both citizens of the United States, have invented or discovered certain new and useful Improvements in Apparatus for Coating with Molten Metal, of which improvements the following is a specification.

Our invention relates to apparatus for coating sheets with molten metal, and the objects thereof are to improve such apparatus to the end that a coating of more uniform thickness may be continually applied, to make less difficult the work of the operator of the apparatus, and to increase the length of periods during which such apparatus may be used without grinding or otherwise truing the coating rolls.

While unlimited to apparatus for coating with any specific metal or metals; our invention is particularly applicable to tin-plating apparatus and is so illustrated in the accompanying sheets of drawings in which Figure 1 is a transverse vertical sectional view of a tin-plating apparatus, the plane of view being indicated by the line I—I Fig. 2; Fig. 2 a sectional view taken on the broken line II—II, Fig. 1; Fig. 3 a plan view of a portion of the apparatus shown in Fig. 2; Fig. 4 a side view of a detached portion of a modification of construction, the plane of view being similar to that indicated by the line II—II, Fig. 1; Fig. 5 a sectional view of the apparatus of Fig. 4, the plane of view being indicated by the line V—V, Fig. 4; Fig. 6 a view similar to Fig. 4 showing a still further modification in construction; and Fig. 7 a sectional view taken on the line VII—VII, Fig. 6.

The nature of our invention may be understood from an explanation, with reference to Figs. 1 and 2 of the drawings, of the type of apparatus heretofore usually employed for coating sheet metal with tin. A molten body of tin is maintained in a pot 1 at about the level indicated by the dotted line 2. Sheets to be coated enter the unillustrated right-hand portion of the pot 1 between guides 3 and 4, the operator pushing each sheet through such guides, as well as through the guides 5, 6, until the forward edge of the sheet is engaged by and between a pair of coating rolls 7, which are rotated by mechanism not shown in the drawings. A similar pair of coating rolls 8 are arranged above the rolls 7 and are also positively rotated. The purpose of the pairs of rolls 7 and 8 is to remove from the faces of the sheets the surplus metal adhering to them. Some of this surplus metal adheres to each roll and is wiped therefrom by means of a wiper 9 arranged longitudinally of the roll and extending the full length thereof. Each wiper usually consists of a strip of felt or asbestos backed by a metal plate, and is secured to the end of an arm 10 pivotally connected to a hanger 11 attached to, or forming a part of, a frame 12, which frame is suitably supported upon the upper edges of the pot 1. To the arm 10, between the wiper 9 and the pivotal connection of such arm to the hanger 11, there is pivotally attached a rod 13 extending upwardly through the frame 12.

As seen in Fig. 2 a plurality of arms 10 are attached at suitable intervals to each wiper 9, and to each arm there is attached a rod 13. These rods are vertically adjustable, and for such purpose the usual practice has been to surround the upper end of each rod with a spring 14, bearing at its lower end upon the frame 12 and at its upper end upon a nut 15, which may be adjusted to increase or decrease the compression under which the spring 14 is held. Thus the pressure, upon a coating roll, of the portion of the wiper adjacent to a given rod 13 is in proportion to the compression under which the spring 14 surrounding such rod is held.

To adjust the pressure of a wiper upon its roll, it has been necessary to separately tighten each nut 15 of each rod 13, and to do this a workman must work above the top of the pot, which is quite hot, and from which offensive fumes continuously rise from the molten bath of tin and from the heated oil resting on the surface thereof. The result has been that the wipers have not been properly adjusted, and as a consequence thereof they not only wear down unevenly themselves, but cause the rolls to wear unevenly.

Furthermore, it has been found to be practically impossible from a mechanical point of view to uniformly adjust the full length of a wiper by independently adjusting the several rods 13 attached to it. The rolls, particularly the lower pair of rolls 7, are below the surface of the oil bath so that the position of the wipers with respect to the rolls cannot be observed. Also, the adjustment of the wipers cannot be effected by removing the frame 12 from the pot because the molten tin, adhering to the wipers and the parts connected to them, solidifies very quickly after the frame is removed, making it impossible to effect an adjustment of the wipers without heating them and the rolls sufficiently to melt the tin from them.

The uneven wearing of the coating rolls caused by the uneven adjustment of the wipers results in an uneven coating of the sheets, it being understood that, to the extent that the rolls are insufficiently wiped, the thickness of the coating will be increased. Also, the uneven wearing of the coating rolls necessitates their frequent grinding to true their surfaces. Furthermore, the wipers, when uniformly adjusted, wear down unevenly, and must be replaced more frequently than if worn down evenly.

In the practice of our invention we have overcome the above explained difficulties, and as a result thereof the coating upon plates is of more uniform thickness, the rolls require grinding less frequently, the wipers wear longer and the workmen are relieved of the disagreeable and difficult task of adjusting the wipers from the top of the pot. According to our invention we provide a single means for simultaneously adjusting the entire length of a wiper uniformly with respect to its roll, such means being operable from the end of a pot. Preferably, a single means is provided for adjusting one wiper of each of the pairs of rolls 7 and 8, namely, the rolls which lie in vertical alinement, and means are provided whereby the wipers of such rolls may, preliminarily, be independently adjusted.

In the illustrative embodiment of our invention there are provided two sets of wiper-adjusting apparatus, which sets are alike in every respect. Accordingly the following description will be limited to an explanation of but one set of apparatus, namely, that for adjusting the left hand wipers, as they are viewed in Fig. 1. Referring first to the embodiment of our invention illustrated in Figs. 1 and 2, two arms 10 and 10ª are pivotally attached to each hanger 11 and are connected to a single rod 13, the arm 10ª being provided with a wiper 9ª coöperating with a roll 8. The intermediate portion of each rod 13 is angular in cross section, and on such angular portion there is arranged an exteriorly threaded sleeve 16 which permits the rod to move longitudinally within it, but which is not rotatable upon the rod. A worm wheel 17, arranged in a housing 18 of the frame 12, is threaded interiorly to engage the outer threaded face of the sleeve 16 and meshes with a worm shaft 19, which, as seen in Fig. 2, extends from one end of the pot to the other. For rotating the shaft 19, its outer end is provided with an angular portion 20 adapted to be engaged by a crank. To afford means for independently adjusting the wipers 9 and 9ª with respect to each other and to their coöperating rolls before the frame is placed upon the pot, each rod 13 is, in this embodiment of our invention, constructed of two parts connected to each other by a short rod 21, the ends of which are screw-threaded in opposite directions.

After the wipers 9 and 9ª have been preliminarily adjusted by the independent turning of the nuts 15 and rods 21, and the frame is placed in a pot 1, all of the rods 13 may, by turning the shaft 19, be simultaneously adjusted equal amounts to effect a uniform adjustment of the wipers 9 and 9ª. The turning of this shaft to tighten the wipers causes each worm wheel 17 to rotate upon its sleeve 16, and such sleeve, being held against rotation by the angular portion of the rod 13 which in itself is held against rotation by reason of its attachment to the arms 10, 10ª, moves upwardly to increase the compression upon the spring 14, which increase in compression causes the rod 13 to move upwardly to increase the pressure of the wipers upon the rolls.

In the embodiment of our invention illustrated in Figs. 4 and 5, the arms 10, 10ª are attached to separate rods 22 and 23, respectively, which rods engage the outer ends of a beam or lever 24 pivotally supported intermediate of its ends by a rod 13ª, which corresponds to the rod 13 of the apparatus of Figs. 1 and 2. By the provision of separate rods 22 and 23 for the arms to which the upper and lower wipers are connected, and by connecting such rods to the rod 13ª by means of pivoted lever or beam 24, the pressure of one wiper upon its roll may be maintained different than that of the other wiper upon its roll. These pressures may be varied by changing the position, upon the lever 24, of the pivot point of the rod 13 with reference to the pivot points of the rods 22 and 23. In this embodiment of our invention the rods 13ª may be vertically adjusted simultaneously in the same manner as are the rods 13 of Figs. 1 and 2.

In the embodiment of our invention illustrated in Figs. 6 and 7, means are provided whereby the independent adjustment of the wipers 9, 9ª with respect to each other, may be effected at a point above the surface of the oil bath in the pot 1. Each rod 13ᵇ, corresponding with the rods 13 of Figs. 1 and 2, is attached to the upper end of a yoke 25 by means of a wedge 26 extending through slots formed in the rod and yoke. The yoke is in turn attached to an arm 10 and the lower end of the rod 13^b is attached to a superposed arm 10^a. By further inserting or withdrawing the wedge 26, the relative positions of superposed arms 10 and 10^a may be adjusted. It will be understood that any other suitable means may be provided above the surface of the oil bath for adjusting the wipers 9 and 9^a with respect to each other.

According to the provisions of the patent statute we have described the principle and operation of our invention together with several forms of construction whereby it may be practised. However, we desire to have it understood that our invention may be practised by other forms of construction than those specifically shown and described, and also in apparatus for coating sheets with molten metal other than tin.

We claim as our invention:

1. In a machine for coating sheets with molten metal, the combination with a coating roll, of a wiper extending longitudinally of and adapted to bear upon the face of said roll, and a single means for uniformly adjusting said wiper with respect to said roll.

2. In a machine for coating sheets with molten metal, the combination with a coating roll, of a wiper extending longitudinally of and adapted to bear upon the face of said roll, and means for simultaneously and uniformly adjusting the full length of said wiper with respect to said roll.

3. In a machine for coating sheets with molten metal, the combination with two coating rolls arranged one above the other, of wipers extending longitudinally of and adapted to bear upon the faces of said rolls, and means for simultaneously and uniformly adjusting the full length of both wipers with respect to said rolls.

4. In a machine for coating sheets with molten metal, the combination with two coating rolls arranged one above the other, of wipers extending longitudinally of and adapted to bear upon the faces of said rolls, means for simultaneously and uniformly adjusting the full length of both wipers with respect to said rolls, and independent means for adjusting said wipers with respect to each other.

5. In a machine for coating sheets with molten metal, the combination of a frame, a coating roll, a wiper extending longitudinally of and adapted to bear upon the face of said roll, a plurality of supporting rods connected at intervals to said wiper, and means carried by said frame for simultaneously moving said rods whereby said wiper may be uniformly adjusted with respect to said roll.

6. In a machine for coating sheets with molten metal, the combination of a frame, a coating roll, a wiper extending longitudinally of and adapted to bear upon the face of said roll, a plurality of arms connected at intervals to said wiper and pivotally connected to said frame, a rod connected to each of said arms, a worm shaft mounted upon said frame, and connections between said shaft and said rods whereby the rotation of the shaft effects simultaneous movements of said rods to uniformly adjust said wiper with respect to said roll.

7. In a machine for coating sheets with molten metal, the combination of a pot, a coating roll arranged adjacent to the discharge opening of the pot, a wiper extending longitudinally of and adapted to bear upon the face of said rolls, and a single means operable from an end of the pot for uniformly adjusting said wiper with respect to said roll.

8. In a machine for coating sheets with molten metal, the combination with two coating rolls arranged one above the other, of wipers extending longitudinally of and adapted to bear one upon the face of each of said rolls, and means for simultaneously adjusting the full lengths of both wipers with respect to said rolls, said adjusting means including means whereby the pressure of one wiper upon its roll may be different than that of the other wiper upon its roll.

In testimony whereof we have hereunto set our hands.

EDGAR G. PORTER.
JOHN L. KLINDWORTH.

Witnesses:
 WM. L. POLLOCK,
 ROBERT CREIGHTON.